(12) United States Patent
Nathwani

(10) Patent No.: US 9,191,794 B2
(45) Date of Patent: Nov. 17, 2015

(54) METHOD AND APPARATUS PERTAINING TO BLUETOOTH#-CONVEYED VOICE-BASED USER INPUT

(75) Inventor: Sanjay Nathwani, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/562,885

(22) Filed: Jul. 31, 2012

(65) Prior Publication Data

US 2014/0038568 A1 Feb. 6, 2014

(51) Int. Cl.
*H04W 4/16* (2009.01)
*H04M 1/27* (2006.01)
*H04M 3/00* (2006.01)
*H04W 88/06* (2009.01)

(52) U.S. Cl.
CPC ............. *H04W 4/16* (2013.01); *H04M 1/271* (2013.01); *H04M 3/00* (2013.01); *H04M 2250/02* (2013.01); *H04W 88/06* (2013.01)

(58) Field of Classification Search
CPC ....... H04W 4/16; H04W 88/06; H04M 1/271; H04M 3/00; H04M 2250/02
USPC .............. 455/414.1–414.4, 41.1–41.3, 151.2, 455/569.1, 569.2; 701/400–430, 443, 487, 701/488, 538–541
See application file for complete search history.

(56) References Cited

U.S. PATENT DOCUMENTS

| | | | |
|---|---|---|---|
| 7,620,433 B2 * | 11/2009 | Bodley ....................... | 455/575.2 |
| 8,112,037 B2 * | 2/2012 | Ketari .......................... | 455/41.3 |
| 8,452,349 B2 * | 5/2013 | Matsushita et al. ......... | 455/569.2 |
| 2003/0152055 A1 * | 8/2003 | Aragones et al. ............. | 370/338 |
| 2005/0143134 A1 * | 6/2005 | Harwood et al. ............. | 455/563 |
| 2006/0089175 A1 * | 4/2006 | Yun et al. ...................... | 455/567 |
| 2007/0016362 A1 * | 1/2007 | Nelson .......................... | 701/200 |

(Continued)

FOREIGN PATENT DOCUMENTS

| | | |
|---|---|---|
| CN | 201167316 Y | 12/2008 |
| CN | 101601259 A | 12/2009 |

(Continued)

OTHER PUBLICATIONS

Car Working Group; "Bluetooth Doc Hands-Free Profile 1.5 (HFP1.5_Spec)"; XP055047100; Nov. 25, 2005; 93 pages.

(Continued)

*Primary Examiner* — Mehmood B Khan
(74) *Attorney, Agent, or Firm* — Gary S. Winer; Fleit Gibbons Gutman Bongini & Bianco P.L.

(57) ABSTRACT

An apparatus having both a Bluetooth-compatible transceiver and a cellular-telephony transceiver has a control circuit operably coupled to the foregoing configured to facilitate at least one on-board application using voice-based user input. The control circuit, upon determining that a call-setup message as received via the Bluetooth-compatible transceiver specifies a particular predetermined number (such as a predetermined number that comprises an invalid number to serve as a telephone number) to call, automatically uses audio content received via the Bluetooth-compatible transceiver as the aforementioned voice-based user input for that on-board application. By one approach, the apparatus can provide that predetermined number to a given secondary platform as part of a conveyed contacts list.

12 Claims, 3 Drawing Sheets

(56) References Cited

U.S. PATENT DOCUMENTS

| | | | |
|---|---|---|---|
| 2007/0165651 A1* | 7/2007 | Sukegawa et al. | 370/401 |
| 2007/0202929 A1* | 8/2007 | Satake | 455/569.1 |
| 2008/0032629 A1* | 2/2008 | Wang et al. | 455/41.2 |
| 2008/0261524 A1* | 10/2008 | Grushkevich | 455/41.2 |
| 2009/0011799 A1* | 1/2009 | Douthitt et al. | 455/569.1 |
| 2009/0111529 A1* | 4/2009 | Miyake | 455/569.2 |
| 2009/0204410 A1* | 8/2009 | Mozer et al. | 704/275 |
| 2010/0100310 A1* | 4/2010 | Eich et al. | 701/201 |
| 2010/0105446 A1* | 4/2010 | Charlier et al. | 455/569.1 |
| 2010/0130195 A1* | 5/2010 | Rohaly et al. | 455/425 |
| 2010/0210315 A1* | 8/2010 | Miyake | 455/569.2 |
| 2010/0245585 A1* | 9/2010 | Fisher et al. | 348/164 |
| 2011/0119276 A1* | 5/2011 | Borghetti et al. | 707/748 |
| 2011/0195758 A1 | 8/2011 | Damale et al. | |
| 2011/0263235 A1* | 10/2011 | Kassiedass | 455/415 |
| 2012/0071097 A1* | 3/2012 | Matsushita et al. | 455/41.2 |
| 2012/0142323 A1* | 6/2012 | Okuda | 455/415 |
| 2012/0183130 A1* | 7/2012 | Niemela | 379/265.02 |
| 2013/0005260 A1* | 1/2013 | Hosono et al. | 455/41.2 |
| 2013/0072162 A1* | 3/2013 | Celik | 455/412.1 |
| 2013/0189963 A1* | 7/2013 | Epp et al. | 455/414.1 |

FOREIGN PATENT DOCUMENTS

| | | |
|---|---|---|
| CN | 102612004 A | 7/2012 |
| EP | 2129083 A1 | 12/2009 |
| WO | 2008/079891 A2 | 7/2008 |
| WO | 2009/073806 A2 | 6/2009 |

OTHER PUBLICATIONS

Extended European Search Report from related European Patent Application No. 12178745.1; 8 pages.
Chinese Office Action from related Chinese Patent Application No. 201310328714.0 dated Jan. 28, 2015; 9 pages.

* cited by examiner

METHOD AND APPARATUS PERTAINING TO BLUETOOTH#-CONVEYED VOICE-BASED USER INPUT

FIELD OF TECHNOLOGY

The present disclosure relates to electronic devices, including but not limited to portable electronic devices having Bluetooth™ capability.

BACKGROUND

Electronic devices, including portable electronic devices, have gained widespread use and may provide a variety of functions including, for example, telephonic, electronic messaging, and other personal information manager application functions. Portable electronic devices include, for example, several types of mobile stations such as simple cellular telephones, so-called smartphones, and laptop and pad/tablet-styled computers.

Many of these devices include, in addition to other wireless communications capabilities, Bluetooth™ capability. Bluetooth™ (hereinafter "Bluetooth") refers to a wireless communications standard managed by the Bluetooth Special Interest Group. The Bluetooth standard makes use of frequency-hopping spread spectrum techniques and typically provides for only a very short-range wireless connection (often offering a range of only about ten meters in many common application settings). This standard comprises a packet-based approach that relies upon a so-called master-slave paradigm where a master device can support a limited (plural) number of subservient devices.

Per one typical application setting a Bluetooth-capable smartphone couples (called "pairing") via Bluetooth to a vehicle's audio-entertainment system. The Bluetooth standard then supports, for example, displaying the smartphone's contacts list at the vehicle's audio-entertainment system and initiating a cellular-telephony call via the smartphone in response to an occupant of the vehicle selecting a particular telephone number from that contacts list. The Bluetooth connection then carries the audio portion of that call to permit the incoming audio information to be rendered audible by the vehicle's audio-entertainment system and for the caller's spoken response as captured by the latter's microphone system to be transferred to the smartphone for transmission to the called party.

As useful as such capabilities are, however, the Bluetooth standard offers (more or less by design) only a limited set of capabilities in these regards. For example, while the Bluetooth standard natively carries spoken audio content in the context of a call as described above, in many cases the Bluetooth connection will not natively support carrying audio content for other purposes (such as, for example, conveying voice-based user instructions in service of some internal application of the receiving device).

DETAILED DESCRIPTION

Figure 1:
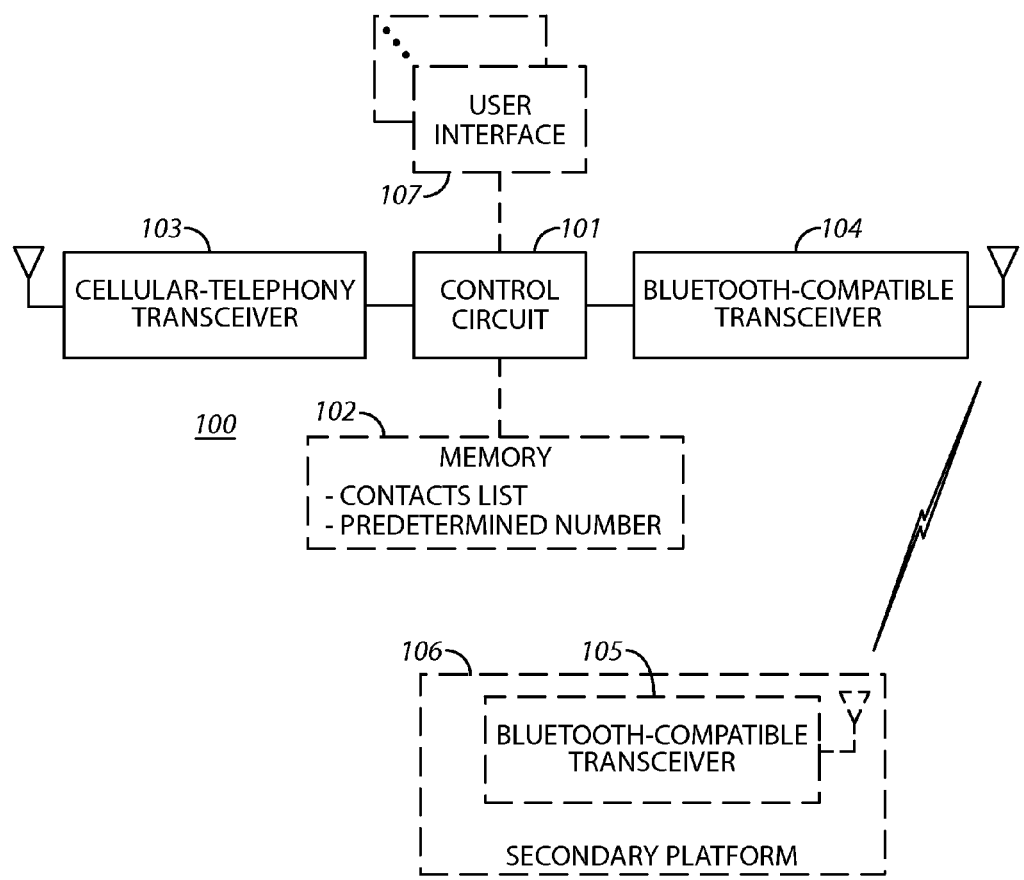
FIG. 1 is a block diagram in accordance with the disclosure.

The following describes an apparatus and method pertaining to an apparatus having both a Bluetooth-compatible transceiver and a cellular-telephony transceiver. A control circuit operably couples to the foregoing and is configured to facilitate at least one on-board application using voice-based user input. In addition, the control circuit, upon determining that a call-setup message as received via the Bluetooth-compatible transceiver specifies a particular predetermined number (such as a predetermined number that comprises an invalid number to serve as a telephone number) to call, automatically uses audio content received via the Bluetooth-compatible transceiver as the aforementioned voice-based user input for that on-board application.

By one approach, although the secondary platform may not recognize that the predetermined number is insufficient to in fact establish a telephone connection, the aforementioned control circuit recognizes that predetermined number for what it is and reacts per these teachings. By one approach, the apparatus can provide that predetermined number to a given secondary platform as part of a conveyed contacts list.

So configured, these teachings leverage a secondary platform's limited native ability to facilitate Bluetooth-based call-origination functionality to establish a Bluetooth audio path by which the user can then convey spoken commands to effect a different purpose and function altogether. By one approach, the foregoing includes having the apparatus mimic a telephone call via the Bluetooth link to thereby provide the audio-bearing communications pathway between the apparatus and the secondary platform.

It is of course possible that an incoming call will occur during the pendency of the mimicked call. The Bluetooth standard supports a call-waiting protocol as an optional capability, and hence the secondary platform may, or may not, support call waiting. As one optional approach these teachings will accommodate configuring the control circuit to use Bluetooth call-waiting protocol when it is available and to otherwise mimic conclusion of the above-described call upon detecting the incoming call. So configured, the establishment of a mimicked-call connection for the purpose of providing a path for spoken user instructions need not interfere with the ordinary telephony-based functionality of the Bluetooth-paired devices regardless of how empowered, or not, the secondary platform may be in these regards.

So configured, these teachings provide a way for limited Bluetooth capability in many application settings to nevertheless accommodate functionality that would otherwise remain unavailable. In particular, these teachings provide a convenient way for a Bluetooth-paired device to convey spoken instructions to another device notwithstanding a lack of a native ability to convey such spoken instructions in ordinary course.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents an illustrative example of an apparatus 100 that comports with many of the present teachings. In this particular example the apparatus 100 will be presumed to comprise a Bluetooth-enabled smartphone. It will be understood, however, that the specifics of such an example are intended to serve only an illustrative purpose and that the present teachings will readily accommodate a variety of approaches in these regards.

This apparatus 100 includes a control circuit 101. Such a control circuit 101 can comprise a fixed-purpose hard-wired platform or can comprise a partially or wholly programmable platform. These architectural options are well known and understood in the art and require no further description here. This control circuit 101 is configured (for example, by using corresponding programming as will be well understood by those skilled in the art) to carry out one or more of the steps, actions, and/or functions described herein.

By one optional approach this apparatus 100 can further include a memory 102 that operably couples to the control circuit 101. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

This memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

This memory 102 can also serve to store one or more contacts lists. Contacts lists are known in the art and typically serve as a kind of address book listing one or more contacts of the user. The contact information in a smartphone often includes at least a telephone number and/or an electronic mailing address as well as a corresponding name for the contact. In the present example this contacts list also includes a particular predetermined number to be used as described below. This particular predetermined number may comprise, if desired, an invalid number to serve as a telephone number. Examples in this regard might include, but are certainly not limited to, such numbers as "555-555-5555," "12345," and "000000."

The control circuit 101 also operably couples to a cellular-telephony transceiver 103 and a Bluetooth-compatible transceiver 104. So configured the apparatus 100 can initiate, conduct, and terminate telephone calls in accordance with well-understood prior art practice. The apparatus 100 can also pair with other Bluetooth-compatible devices and carry out corresponding supported communications via the Bluetooth protocol. In particular, the apparatus 100 can pair via the Bluetooth-compatible transceiver 104 with the Bluetooth-compatible transceiver 105 of a corresponding nearby secondary platform 106. (The present description presumes this secondary platform 106 to be a vehicle's Bluetooth-capable audio-entertainment system. It will again be understood, however, that no particular limitations are intended by the specificity of this example.)

If desired, the apparatus 100 can include any number of other components. As one simple example in these regards, the apparatus 100 can further include one or more user interfaces 107 that operably couple to the aforementioned control circuit 101. This user interface 107 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, and so forth) to facilitate receiving information and/or instructions from a user and/or providing information to a user.

So configured, and in accordance with prior art practice, a user can select a telephone number to dial at the secondary platform 106 and the latter can use the Bluetooth protocol to communicate this telephone number to the apparatus's control circuit 101. The latter, in turn, will then use the cellular-telephony transceiver 103 to establish a call using that telephone number. The back and forth conversation of the calling and called parties can be both input and audibly rendered at the secondary platform 106 as the secondary platform 106 and the apparatus 100 work in tandem via native Bluetooth-based support in these regards. This capability supports, for example, so-called hands-free calling.

Figure 2:
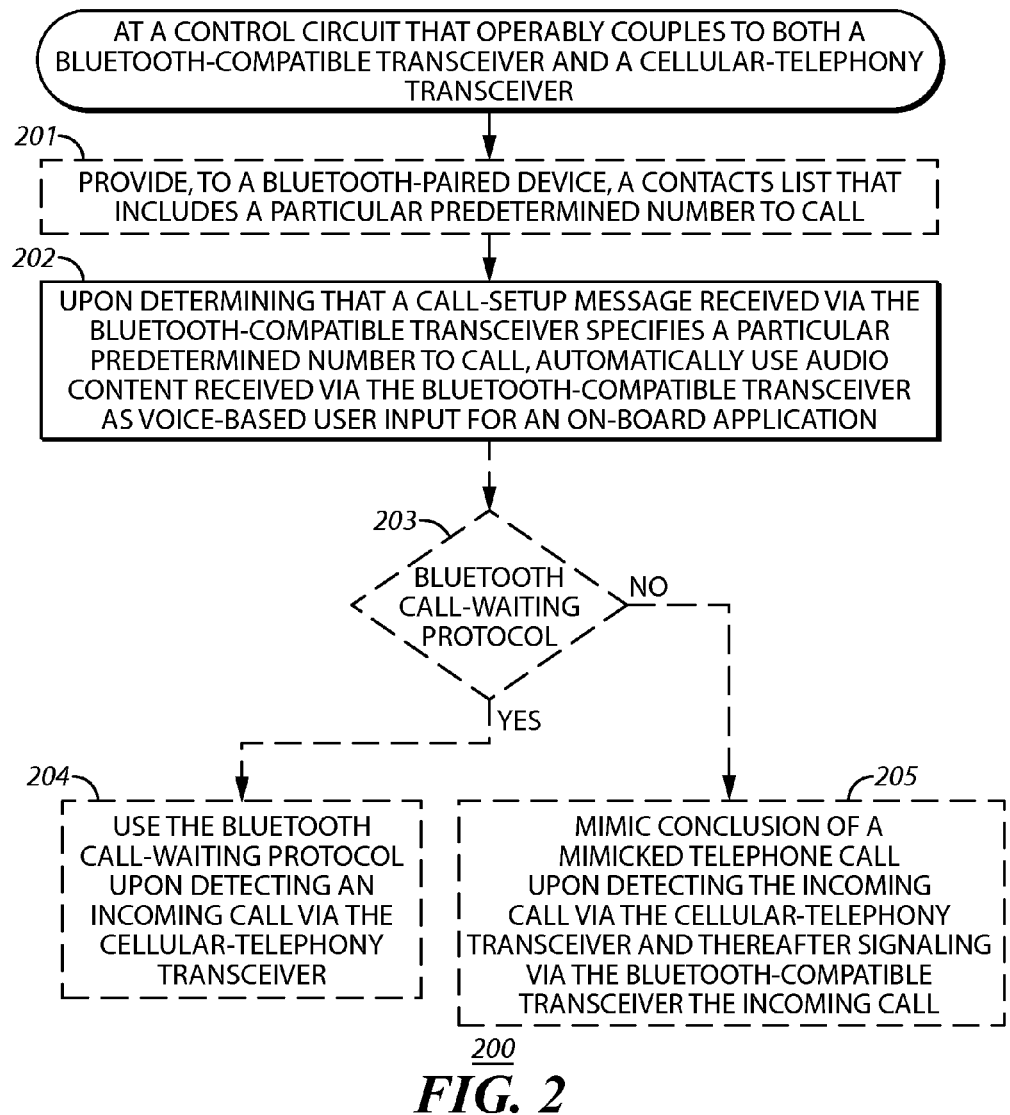
FIG. 2 is a flow diagram in accordance with the disclosure.

Pursuant to the present teachings, however, such an apparatus 100 can further leverage the Bluetooth protocol in support of non-native functionality. By way of an illustrative example in these regards, the control circuit 101 can be configured to carry out the process 200 presented in FIG. 2.

This process 200 can optionally include providing 201 a contacts list to a Bluetooth-paired device (such as the above-described secondary platform 106). This contacts list, in turn, can include the aforementioned particular predetermined number that the Bluetooth-paired device will categorically understand to comprise a telephone number even though the particular number itself may be invalid for such use for any number of reasons. Instead, this particular predetermined number will be a number that the control circuit 101 is pre-configured to recognize as corresponding to this particular process 200.

In any event, this process 200 presumes the secondary platform 106 to have the aforementioned predetermined number available to the user. The user, in turn, understands that certain apparatus 100 functionality can be remotely instigated by causing the secondary platform 106 to initiate a "call" via the Bluetooth connection using that predetermined number. By way of a more specific example, the user here understands that voice-recognition-based instructions can be provided to the apparatus 100 via the secondary platform's 106 microphone and Bluetooth connection by causing the secondary platform 106 to "dial" the predetermined number. (In support of this approach, if desired, the above-mentioned contacts list might include a "contact" named "Voice Instructions" that is associated with the predetermined number. In such a case the user need only select the "Voice Instructions" contact from the contacts list and the secondary platform will proceed to work with the apparatus 100 to establish a call via the predetermined number.)

Accordingly, upon determining 202 that the control circuit 101 receives a call-setup message via the Bluetooth-compatible transceiver 104 that specifies the particular predetermined number to call, the control circuit 101 automatically uses audio content then received via the Bluetooth-compatible transceiver 104 as voice-based user input for an on-board application. The foregoing can comprise, by one approach, mimicking a telephone call via the Bluetooth-compatible transceiver 104 with the Bluetooth-paired device (i.e., the secondary platform 106) to thereby provide the communication pathway from the Bluetooth-paired device for that audio content. The control circuit 101 may prompt the user in these regards by verbalizing, for example, a statement such as, "What are your instructions?"

As the user speaks, that speech is conveyed via the mimicked call from the secondary platform 106 to the control circuit 101. The control circuit 101 then utilizes one or more speech recognition approaches of choice to recognize the substantive content of that speech and uses that recognized audible content as instructions per the usual voice-recognition-based functionality of the apparatus 100. Accordingly, although the secondary platform 106 may be behaving as though the speech is being conveyed pursuant to a telephone call, the speech is in fact applied by the control circuit 101 in service of any number of other on-board applications such as, but not limited to, a calendar application, a to-do list application, a navigation application, an email application, a local-search application, and so forth.

In fact, numerous voice-controlled applications are known in the art. As the present teachings are not particularly sensitive to any particular choices in these regards, further corresponding elaboration will not be provided here for the sake of brevity.

Such a session can be concluded in any of a variety of ways. By one approach, for example, the user can simply assert an "end call" button via the secondary platform 106. The latter will then respond by signaling termination of the mimicked call to the control circuit 101.

If desired, this process 200 can optionally accommodate call-waiting processing. In particular, the control circuit 101 can be configured to determine 203 whether the secondary platform 106 can accommodate the Bluetooth call-waiting protocol. When true, the control circuit 101 can simply use 204 the Bluetooth call-waiting protocol upon detecting an incoming call via the cellular-telephony transceiver 103. When not true, however, the control circuit 101 can instead mimic 205 concluding the mimicked telephone call upon detecting the incoming call and therefore signal the secondary platform 106 regarding the incoming call via the Bluetooth-compatible transceiver 104.

Figure 3:
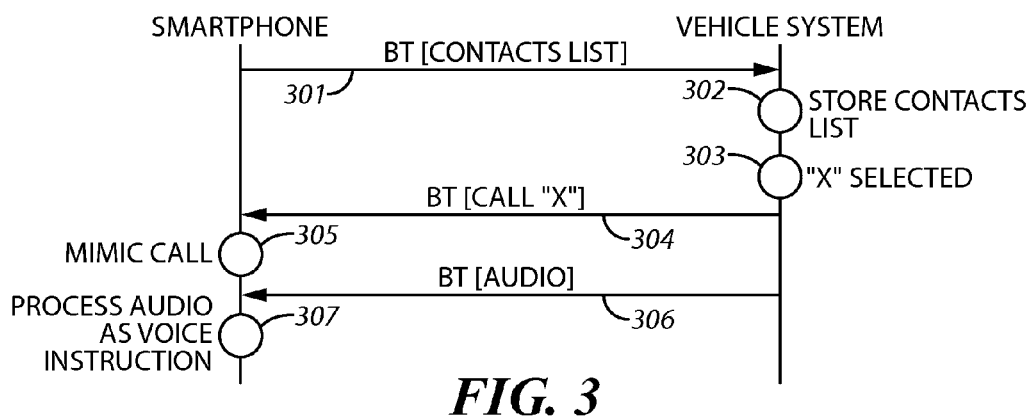
FIG. 3 is a call-flow diagram in accordance with the disclosure.

FIG. 3 presents a simple example in accordance with the foregoing. In this example, a smartphone transmits a contacts list 301 to a vehicle's audio system via an available Bluetooth connection. The transmitted contacts list includes the predetermined contact number "X." The vehicular system stores 302 this contacts list. Later, when the user selects 303 the contact number "X" from this list, the vehicular system transmits a call set-up message 304 that includes that number "X" to the smartphone via the Bluetooth connection. The smartphone recognizes the number "X" and thereby determines that, instead of initiating an actual telephone call, a call is to be mimicked 305. Audio 306 (including spoken commands from the user) are then received from the vehicular system at the smartphone and processed 307 as voice instructions for one or more applications on-board the smartphone.

Figure 4:
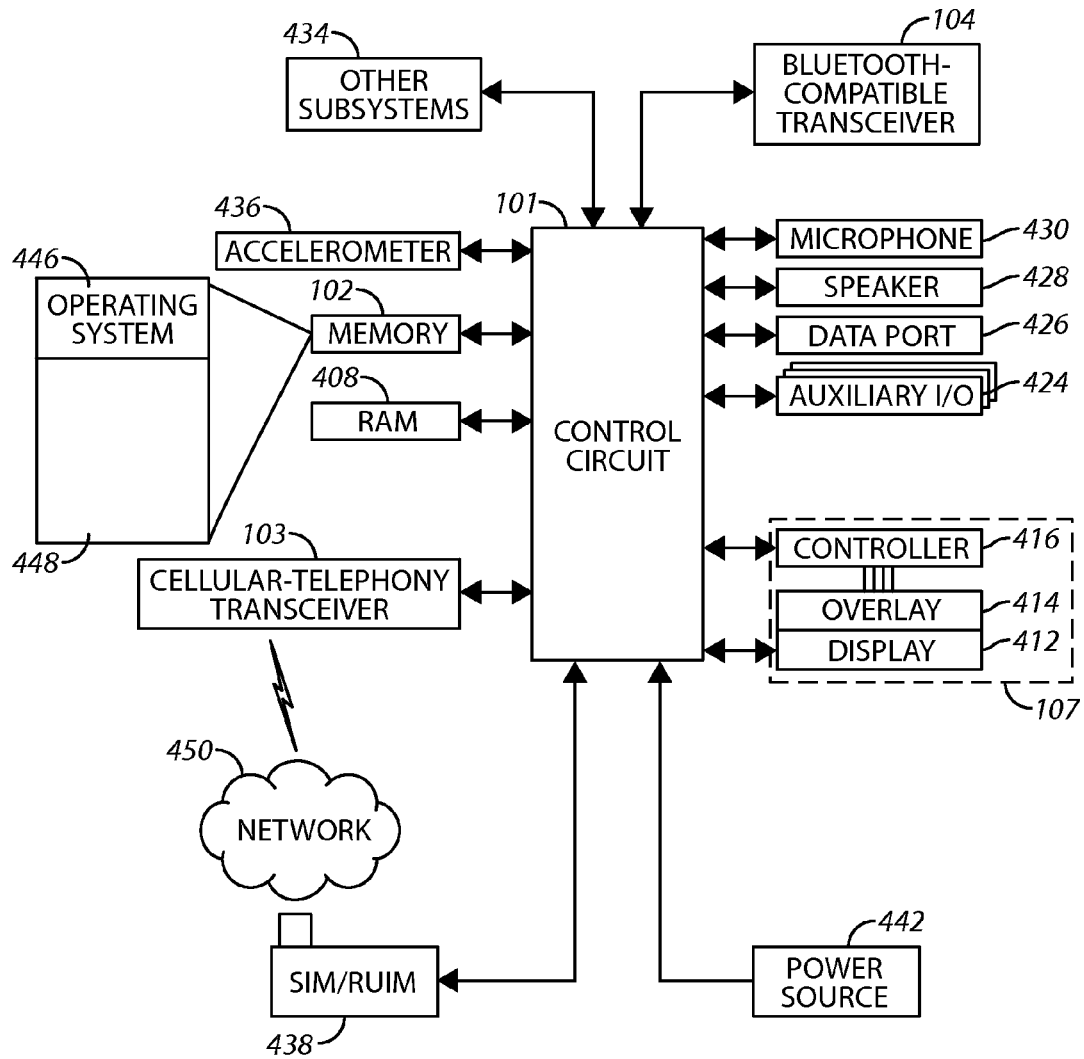
FIG. 4 is a block diagram in accordance with the disclosure.

As noted above, the apparatus 100 can comprise any of a variety of portable electronic devices. A more detailed example of such a portable electronic device is the portable communications device shown in FIG. 4. In this example various data and voice communications are performed via the aforementioned cellular-telephony transceiver 103 that receives messages from and sends messages to a corresponding wireless network 450.

The wireless network 450 may comprise any of a variety of wireless networks that offer cellular telephony service. To identify a subscriber for network access, the portable electronic device may utilize a Subscriber Identity Module or a Removable User Identity Module (SIM/RUIM) card 438 for communication with a network, such as the wireless network 450. Alternatively, user identification information may be programmed into the aforementioned memory 102. The control circuit 101 also operably couples to a Bluetooth-compatible transceiver 104 as described above.

A power source 442, such as one or more rechargeable batteries or a port to an external power supply, powers the electronic device. The control circuit 101 may interact with an accelerometer 436 that may be utilized to detect direction of gravitational forces or gravity-induced reaction forces. The control circuit 101 also interacts with a variety of other components, such as a Random Access Memory (RAM) 408, an auxiliary input/output (I/O) subsystem 424, a data port 426, a speaker 428, a microphone 430, and other device subsystems 434 of choice.

A display 412 can be disposed in conjunction with a touch-sensitive overlay 414 that operably couples to an electronic controller 416. Together these components can comprise a touch-sensitive display that serves as the aforementioned user interface 107. Information, such as text, characters, symbols, images, icons, and other items may be displayed on the touch-sensitive display 412 via the control circuit 101.

This portable electronic device includes an operating system 446 and software programs, applications, or components 448 that are executed by the control circuit 101 and are typically stored in a persistent, updatable store such as the aforementioned memory 102. Additional applications or programs may be loaded onto the portable electronic device through the wireless network 450, the auxiliary I/O subsystem 424, the data port 426, the Bluetooth-compatible transceiver 104, or any other suitable subsystem 434.

So configured, the often-considerable voice-controlled capabilities of a given electronic device for any of a variety of different applications can be extended via Bluetooth to a considerably less capable secondary platform notwithstanding that the latter's native Bluetooth capabilities may be considerably or even wholly lacking in those regards. As a result compatible interaction can be provided amongst a broader range of devices. These teachings are readily scaled to accommodate a wide variety of devices and Bluetooth implementations as well as a great variety of voice-controlled applications.

The present disclosure may be embodied in other specific forms without departing from its essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

I claim:

1. An apparatus comprising:
a Bluetooth-compatible transceiver;
a cellular-telephony transceiver;
a control circuit operably coupled to both the Bluetooth-compatible transceiver and the cellular-telephony transceiver and configured, at least in part, to:
facilitate at least one on-board application other than call setup using voice-based user input;
upon determining that a call-setup message received via the Bluetooth-compatible transceiver from a vehicle's audio-entertainment system specifies a particular predetermined number to call, which particular predetermined number to call comprises an invalid number to serve as a telephone number and which particular predetermined number triggers mimicking a telephone call via the Bluetooth-compatible transceiver, automatically mimicking a telephone call for the vehicle's audio-entertainment system and using audio content received from the vehicle's audio-entertainment system via the Bluetooth-compatible transceiver as the voice-based user input for the on-board application to thereby effect a purpose and function of the on-board application.

2. The apparatus of claim 1 wherein the at least one on-board application comprises at least one of:
   a calendar application;
   a to-do list application;
   a navigation application;
   an email application;
   a local-search application.

3. The apparatus of claim 1 further comprising:
   a memory operably coupled to the control circuit and having stored therein a contacts list.

4. The apparatus of claim 3 wherein the contacts list includes the particular predetermined number to call such that the control circuit will automatically provide the particular predetermined number to a Bluetooth-paired device when providing the contacts list to the Bluetooth-paired device.

5. The apparatus of claim 1 wherein the control circuit is configured to automatically use audio content received via the Bluetooth-compatible transceiver as the voice-based user input for the on-board application by, at least in part, mimicking a telephone call via the Bluetooth-compatible transceiver with a Bluetooth-paired device to thereby provide a communication pathway from the Bluetooth-paired device for the audio content.

6. The apparatus of claim 5 wherein the control circuit is further configured to determine whether or not the Bluetooth-paired device supports a Bluetooth call-waiting protocol.

7. An apparatus comprising:
   a Bluetooth-compatible transceiver;
   a cellular-telephony transceiver;
   a control circuit operably coupled to both the Bluetooth-compatible transceiver and the cellular-telephony transceiver and configured, at least in part, to:
      facilitate at least one on-board application other than call setup using voice-based user input;
      upon determining that a call-setup message received via the Bluetooth-compatible transceiver specifies a particular predetermined number to call, which particular predetermined number to call comprises an invalid number to serve as a telephone number, automatically using audio content received via the Bluetooth-compatible transceiver as the voice-based user input for the on-board application to thereby effect a different purpose and function than call setup;
   when the Bluetooth-compatible transceiver supports a Bluetooth call-waiting protocol, use the Bluetooth call-waiting protocol upon detecting an incoming call via the cellular-telephony transceiver;
   when the Bluetooth-compatible transceiver does not support a Bluetooth call-waiting protocol, mimicking conclusion of a mimicked telephone call upon detecting an incoming call via the cellular-telephony transceiver and thereafter signaling via the Bluetooth-compatible transceiver the incoming call.

8. A method comprising: using a control circuit, that operably couples to both a Bluetooth-compatible transceiver and a cellular-telephony transceiver, for:
   determining that a call-setup message has been received via the Bluetooth-compatible transceiver;
   determining that the call-setup message from a vehicle's audio entertainment system specifies a particular predetermined number to call, which particular predetermined number comprises an invalid number to serve as a telephone number and which particular predetermined number triggers mimicking a telephone call via the Bluetooth-compatible transceiver;
   automatically mimicking a telephone call and using audio content received via the Bluetooth-compatible transceiver during the mimicked telephone call as voice-based user input for an on-board application other than call setup to thereby effect a purpose and function of the on-board application.

9. The method of claim 8 further comprising:
   providing a contacts list that includes the particular predetermined number to call to a Bluetooth-paired device.

10. The method of claim 8 wherein automatically using audio content received via the Bluetooth-compatible transceiver as voice-based user input for the on board application comprises, at least in part, mimicking a telephone call via the Bluetooth-compatible transceiver with a Bluetooth-paired device to thereby provide a communication pathway from the Bluetooth-paired device for the audio content.

11. The method of claim 10 further comprising:
   determining whether or not the Bluetooth-paired device supports a Bluetooth call-waiting protocol.

12. A method comprising:
   using a control circuit, that operably couples to both a Bluetooth-compatible transceiver and a cellular-telephony transceiver, for:
   upon determining that a call-setup message received via the Bluetooth-compatible transceiver specifies a particular predetermined number to call, which particular predetermined number comprises an invalid number to serve as a telephone number, automatically using audio content received via the Bluetooth-compatible transceiver as voice-based user input for an on-board application other than call setup to thereby effect a different purpose and function than call setup;
   when the Bluetooth-compatible transceiver supports a Bluetooth call-waiting protocol, using the Bluetooth call-waiting protocol upon detecting an incoming call via the cellular-telephony transceiver;
   when the Bluetooth-compatible transceiver does not support a Bluetooth call-waiting protocol, mimicking conclusion of a mimicked telephone call upon detecting an incoming call via the cellular-telephony transceiver and thereafter signaling via the Bluetooth-compatible transceiver the incoming call.

* * * * *

UNITED STATES PATENT AND TRADEMARK OFFICE
CERTIFICATE OF CORRECTION

PATENT NO. : 9,191,794 B2  
APPLICATION NO. : 13/562885  
DATED : November 17, 2015  
INVENTOR(S) : Sanjay Nathwani Page 1 of 1

It is certified that error appears in the above-identified patent and that said Letters Patent is hereby corrected as shown below:

Title Page, item (54) and in the Specification, Column 1, Line 2, delete the words "BLUETOOTH#-CONVEYED" and insert -- "BLUETOOTH™-CONVEYED" -- in place thereof.

Signed and Sealed this
Twenty-third Day of August, 2016

Michelle K. Lee  
*Director of the United States Patent and Trademark Office*